Feb. 6, 1968     H. D. RICE ETAL     3,367,215

ROTARY WRAPAROUND DIE CUT DIE AND METHOD OF PRODUCING SAME
Filed Aug. 13, 1965

INVENTORS
Harold D. Rice
Lawrence R. Pulley
BY
Hovey, Schmidt, Johnson & Hovey
ATTORNEYS

United States Patent Office 3,367,215
Patented Feb. 6, 1968

3,367,215
ROTARY WRAPAROUND DIE CUT DIE AND
METHOD OF PRODUCING SAME
Harold D. Rice, Leawood, and Lawrence R. Pulley,
Shawnee Mission, Kans., assignors to Hallmark
Cards, Incorporated, Kansas City, Mo., a corporation of Missouri
Filed Aug. 13, 1965, Ser. No. 479,475
19 Claims. (Cl. 76—107)

ABSTRACT OF THE DISCLOSURE

A process for preparing a die cut die having a V-shaped cutting rib where the outer sharp edge there is of precise height and very accurately conforms to a previously prepared design. A pantograph milling machine is used to form a V-shaped groove in a master sheet of bendable material conforming to the shape of the desired design. A metallic layer is then plated over the grooved sheet whereby the rib structure formed in the grooves presents sharp cutting edges upon removal of the plated layer from the sheet. The die cut die is usable in both flat and circular form but for the latter photographic and etching techniques are used to distort the original design before use thereof as a guide in formation of the groove in the master sheet.

This invention relates to the production of cutter dies and, more particuliarly, to a method wherein a cutter die is accurately produced by precise transfer techniques which obviate the heretofore inherent defects involved in the manual production of dies.

In the production of cutter dies for the intricate cuting of paper stock or the like to produce doilies, greeting cards and similar artistic materials, it has been the practice to prepare a line drawing of the design, whereupon a die maker then used this design to bend strips of metal into the configuration of the line drawing. These strips of metal were then mounted on a suitable backing member such as a piece of wood, after sharpening of the normally outermost edge of the metal strips. Upon heat treatment and tempering of the metal to harden the same, sponge rubber or the like was placed in the depressions between the strips of metal to produce the final die. This was a laborious, time-consuming, and very expensive proposition, particularly where intricate dies are concerned.

Therefore, it is the primary object of this invention to provide a method for producing a cutter die for sheet or rolls of stock which avoids the burdensome and expensive procedures previously involved in production of dies of this type, by the simple expedient of forming a transversely V-shaped groove in the surface of a sheet of material and then plating the sheet surface to form a metallic layer which, when separated from the sheet of material, presents a die face having raised rib structure thereon complemental to the original groove and presenting sharp cutting edges, thereby completely eliminating the manual operations heretofore required in the production of such dies.

It is another object of the present invention to provide a method for producing a cutter die wherein the configuration of the die is highly accurate with respect to the original contemplated design, and hence is a notable improvement over previously used die-making techniques which involve inherently inaccurate metal forming operations as opposed to the advantageous metal plating method of this invention. In the method described herein, it is only necessary to place a groove in a sheet of material which is then plated with a metallic layer to form the die, the accuracy of the die depending merely on the relatively simple and easily controlled operation of forming the groove.

It is a further object of the instant invention to provide a method for accurately producing a die as above decribed wherein the groove is formed from the original design or the photographic equivalent thereof by a milling transfer operation to yield a design configuration essentially identical to the original design. The instant novel method is capable of producing a die without the human mechanical errors of previous methods, as the only manual control necessary is that relating to the drawing of the original design. Thus, the final cutter die evolves from an original design by means of a series of precise transfer techniques which do not result in design variations. Not only is the die accurate in configuration, but many dies may be constructed from the original design and each will be identical with the others to assure uniformity of production, such as when old dies wear out and are replaced by new ones.

Yet another object of this invention is to provide a method of producing a cutter die as set forth above wherein the die may be easily produced to have a generally arcuate, cross-sectional configuration so that it is adapted for utilization on a rotary drum in continuous processing operations for production line work. Construction of arcuately-shaped dies by the methods heretofore employed, involved metal forming operations very difficult in comparison with the production of generally planar dies, as the latter involved no longitudinal curvature of the cutting strips. In the instant invention, by utilizing a flexible material as the sheet having grooves formed therein, the sheet may be made to conform to a desired configuration before the metal plating step, and thus the die plated on the sheet corresponds to the predetermined configuration, and there is no extra degree of difficulty involved in comparison to the production of planar dies.

An important aim of the present invention is to provide a cutter die which is plated on a grooved sheet to form cutting edges wherein the groove is accurately transferred from a template having indicia thereon conforming to the original design and forming the groove in the sheet while following the outline of said indicia. This operation is easily and accurately performed by using machines operating on parallel linkage principles, such as a pantograph milling machine.

Other objects will become apparent from the following specification and accompanying drawing, wherein.

Figure 1:
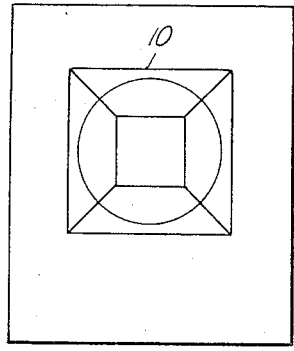
FIGURE 1 is a plan elevational view of an original design.
Figure 2:
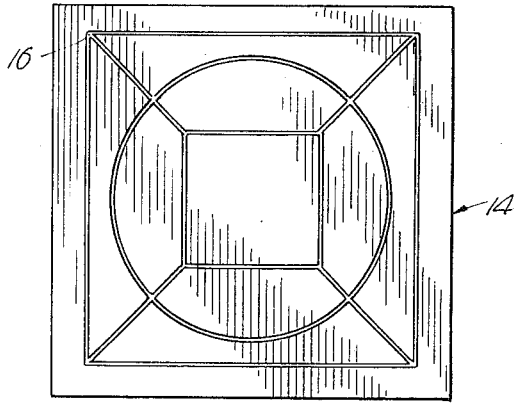
FIG. 2 is a plan elevational view of a template prepared from the original design.
Figure 3:
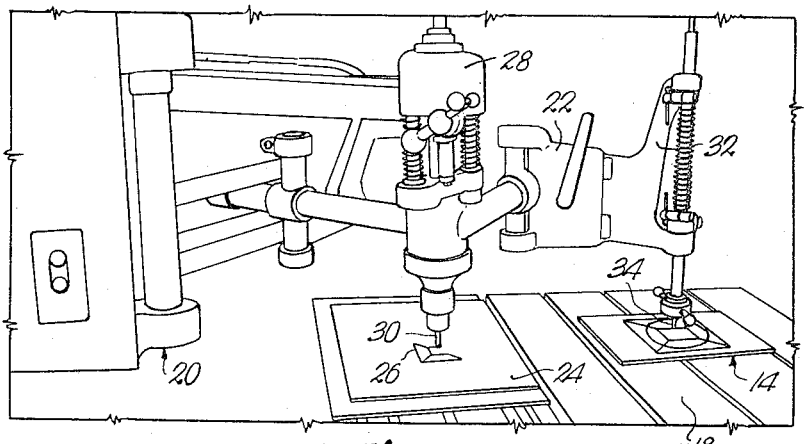
FIG. 3 is a fragmentary, perspective view illustrating the operation of the pantograph milling machine.

In the method of the present invention, an original design 10 is prepared by drawing the same on a sheet of white paper 12. A photographic positive of design 10 is produced and is preferably enlarged photographically to at least twice the size of original design 10.

The positive produced from design 10 is then used to prepare a master template 14 which is initially a magnesium plate sensitized with photoengravers' enamel. The positive of design 10 is superimposed on the magnesium plate and caused to closely adhere thereto by placement of the plate in a vacuum frame. The photoengravers' enamel is then exposed through the positive of design 10 to radiation in the form of ultraviolet light, the enamel beneath the transparent areas of the positive being exposed due to reaction with the ultraviolet light. The enamel beneath the dark portions of the positive which correspond to design 10 is not exposed to the ultraviolet light. The plate is then developed and the exposed enamel becomes hardened and adheres to the magnesium plate, while the unexposed portions of the enamel are washed away to uncover the magnesium plate therebeneath.

The magnesium plate is then etched by an agent which will attack the exposed portions of the magnesium plate and define an indicia therein in the form of an impression 16. Impression 16 conforms to the configuration of design 10 but is twice the size thereof due to the enlargement of the positive.

Template 14 is then placed on table 18 of a pantograph milling machine 20 having a parallel linkage assembly 22. A sheet of material 24, preferably constructed of a synthetic resin material such as Epolene, a product of Eastman Chemical Inter-American, Ltd., Kingsport, Tenn., is placed on table 18 in spaced relationship to template 14 and has a V-shaped groove 26 formed therein conforming to the configuration of impression 16 and thereby design 10 by operation of linkage assembly 22.

Linkage assembly 22 includes a first operating head 28 which carries at its lowermost end a groove-forming means such as a V-shaped milling tool 30. A second operating head 32 is operably coupled through linkage 22 to first head 28 and is provided with a guide member or stylus 34 at its lowermost end. To form groove 26, sylus 34 is positioned within impression 16 and caused to follow the outline thereof, the movement of stylus 34 being correspondingly transferred to milling tool 30 through parallel linkage assembly 22 to form groove 26 in sheet 24. The configuration of design 10 is accurately transferred in this manner due to the parallel relationship between the longitudinal, operating axes of milling tool 30 and stylus 34 and their interconnection by parallel linkage assembly 22.

As noted above, the milling tool 30 is V-shaped and thus forms a generally transversely V-shaped groove 26 in the upper surface of the Epolene sheet 24, but which does not extend entirely through the thickness thereof. The configuration of design 10 is transferred from template 14 to sheet 24 on a reduced scale whereby the design in sheet 24 is reduced in size in comparison with the design in template 14, and is preferably reciprocably related to the photographic enlargement of the positive, whereby the design in sheet 24 is substantially equal in size to the original design 10. The increase in size of the design followed by return of the same to the original size is important to minimize lineal irregularities in groove 26.

Figures 4, 6:
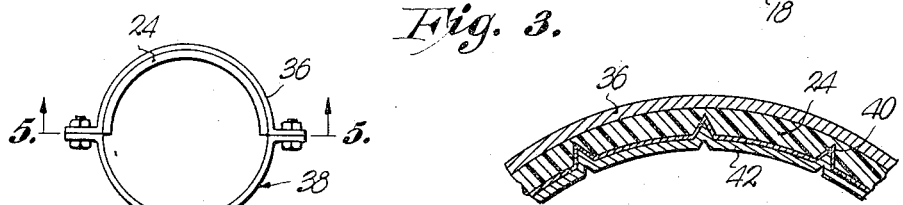
FIG. 4 is an end elevational view of a sheet support showing a sheet mounted therein.
FIG. 6 is a fragmentary, enlarged, cross-sectional view of a plated sheet in the support.
Figure 5:
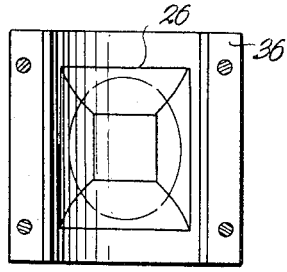
FIG. 5 is a cross-sectional view taken along line 5—5 of FIG. 4.
Figure 7:
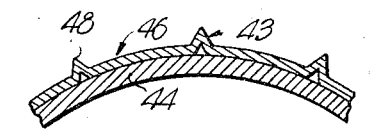
FIG. 7 is a fragmentary, enlarged, cross-sectional view of the die mounted on a backing member.

For production of rotary dies, sheet 24 is taped to the inner surface of a semicylindrical support 36 as shown in FIG. 4 which, in turn, may be connected to a suitable corresponding semicyclindrical support to form a plating drum 38. Groove 26 in sheet 24 faces outwardly when Epolene sheet 24 is placed over the inner surface of support 22.

Prior to connection of semicyclindrical supports 36, a very thin layer of silver 40 is deposited on the concave grooved surface of sheet 24, preferably by a precipitating procedure. Silver layer 40 is shown in FIG. 6, although it is greatly enlarged for illustrative purposes. The precipitation of silver layer 40 on sheet 24 renders the latter conductive whereby it then may receive a metallic layer by electroplating techniques.

In this regard, drum 38 is placed in a first plating bath having a nickel plating solution therein which is preferably Barrett SNH solution, a product of Barrett Chemical Co., Division of Allied Research Industries, Inc., Baltimore, Md. Plating is started in the bath at 0.5 amp per square foot until there is a 0.001 inch thick coating and then slowly increased to 5 amps per square foot until the thickness is 0.002 inch. Then the path condition is changed to 10 amps per square foot until a thickness of .015 inch is obtained, whereupon drum 38 is transferred to Barrett SN-sulfamate nickel bath for additional plating. The second plating bath is maintained at 104° F., and plating is performed in three steps: first hour at 2 amps per square foot, second hour at 5 amps per square foot, and the remaining time, about 8 hours, at 10 amps per square foot. A stress free nickel product is obtained, and preferably with a thickness of 0.05 to 0.06 inch. Nickel layer 42 forms within groove 26 and on the concave surface of sheet 24 and thus a V-shaped rib structure 43 is formed conforming to original design 10.

Nickel layer 42 is then removed from Epolene sheet 24 and the concave face thereof mounted on a cylindrical backing member 44 which may be a rotary drum for continuous die cutting operations. A cutter die is thus formed from nickel layer 42, the layer presenting a convex cutting surface 46 having raised rib structure 43 complemental to groove 26 and projecting radially outwardly from surface 46 to define cutting edges 48.

It is noteworthy that after the original design 10 is made, the final cutter die is produced by a sequence of steps which reproduce the configuration of the design without the inherent inaccuracy of the manual steps of methods heretofore used. The photographic milling and plating steps of this invention are each easily controlled and highly accurate processes and the only manual control necessary is the drawing of the original design.

The method described herein is also advantageous in that the cross-sectional configuration of the die may be planar or nonplanar by using a flexible material for sheet 24. Sheet 24 may then be supported in any desired manner during plating, and the die produced will correspond accordingly. This advantage offers a versatility which was available with prior methods only on a limited scale, as production of longitudinally, non-lineal cutting edges by metal-forming techniques is relatively inaccurate as well as laborious.

Sheet 24 should also be adapted for receiving a well defined V-shaped groove therein to assure that high quality cutting edges 48 are produced when nickel layer 42 is plated onto the sheet. The transverse shape of the groove should be retained even when sheet 24 is formed into nonplanar positions. Epolene, a low density polyethylene produced by Eastman Chemical Inter-American, Ltd., is a suitable material for construction of sheet 24 as it is easily formed into nonplanar shapes for producing arcuate dies and the like, and it also may be precisely milled with a V-shaped tool so that the metallic layer plated thereon will have sharp cutting edges and the final die thus produced will have an accuracy and quality heretofore not obtainable.

By virtue of the use of pantograph 20 in the formation of grooves 26, it can be seen that the depth thereof is uniform and precisely controllable. Furthermore, the walls of the sheet 24 defining the groove are of predetermined relative angularity depending on the size of the tool 30, are at substantially equal angles relative to the surface of the sheet and converge to form a narrow line conforming to the shape of the original design 16.

Having thus described the invention, what is claimed as new and desired to be secured by Letters Patent is:

1. A method of producing a cutter die comprising the steps of:

forming a transversely V-shaped groove of precise depth in one surface of a sheet of material and conforming to the configuration of a certain design, said groove being defined by side walls at predetermined relative angularlity, at substantially equal angles with respect to said one surface of the sheet and converging to present a relatively narrow line of said design configuration;

plating a metallic layer on said one surface and within said groove to form said die; and separating said sheet from said die layer whereby one face thereof has raised V-shaped rib structure thereon complemental to said groove and thereby the design and having an outer sharp cutting edge.

2. A method of producing a cutter die as set forth in claim 1, wherein said sheet is a synthetic resin material.

3. A method of producing a cutter die as set forth in claim 2, wherein said sheet is a nonconductive material and is prepared for plating by the step of depositing a conductive layer on said one surface of said sheet.

4. A method of producing a cutter die as set forth in claim 3, wherein said conductive layer is silver.

5. A method of producing a cutter die as set forth in claim 1, wherein said metallic layer is nickel.

6. A method of producing a cutter die as set forth in claim 1, wherein said die is of nonplanar, cross-sectional configuration and is formed by steps including bending of said sheet of material into configuration presenting a nonplanar cross section, and supporting the sheet in said nonplanar configuration while plating of said metallic layer on said one surface thereof is carried out.

7. A method of producing a cutter die as set forth in claim 6, wherein said die is of arcuate transverse cross-sectional configuration and is formed by steps including bending of said sheet of material into configuration presenting a portion of a cylinder with said one surface thereof defining the concave face of the sheet, and supporting the sheet in said cylindrical configuration while plating of said metallic layer on said one surface thereof is carried out whereby the die has a convex cutting surface and a concave face adapted for atachment to a rotary support member with the rib structure projecting radially therefrom.

8. A method of producing a cutter die comprising the steps of:

preparing a template having a line indicia thereon conforming to the configuration of a certain design;

forming a transversely V-shaped groove of precise depth in one surface of a sheet of material while following the outline of said indicia on the template whereby the groove conforms to the configuration of said design, said groove being defined by side walls at predetermined relative angularity, at substantially equal angles with respect to said one surface of the sheet and converging to present a relatively narrow line of said design configuration;

plating a metallic layer on said one surface and within said groove to form said die; and separating said sheet from said die layer whereby one face thereof has raised rib structure thereon complemental to said groove and thereby the design and having an outer sharp cutting edge.

9. A method of producing a cutter die as set forth in claim 8, wherein the steps of forming the groove in said sheet include positioning a guide member proximal said indicia, operably coupling said guide member to a groove forming means disposed proximal said sheet of material, and moving said guide member to follow the outline of said indicia and to cause the groove forming means to follow a path complemental to the path of said guide member and form said groove in said sheet.

10. A method of producing a cutter die as set forth in claim 8, wherein the step of forming of said groove includes milling a V-shaped groove in said one surface of the sheet of material.

11. A method of producing a cutter die as set forth in claim 8, wherein the step of forming the groove in said sheet includes positioning a guide member proximal said indicia, operably coupling said guide member to a milling tool disposed proximal said sheet of material, and moving said guide member to follow the outline of said indicia and causing the milling tool to follow a path complemental to the path of said guide member and form said groove in said sheet.

12. A method of producing a cutter die as set forth in claim 11, wherein is included the step of disposing the operating axes of said guide member and said milling tool in parallel relationship.

13. A method of producing a cutter die as set forth in claim 11, wherein said milling tool is V-shaped in configuration.

14. A method of producing a cutter die as set forth in claim 8, wherein the step of preparing said template includes treating the surface thereof to form an impression therein to present said indicia.

15. A method of producing a cutter die as set forth in claim 14, wherein forming the groove in said sheet includes the steps of positioning a guide member within said impression, operably coupling said guide member to a groove forming means disposed proximal to said sheet of material, and moving said guide member within said impression to follow the outline of said indicia and to cause the groove forming means to follow a path complemental to the path of said guide member and form said groove in said sheet.

16. A method of producing a cutter die as set forth in claim 9, wherein the step of constructing said template includes preparing an original design, making a photographic image of said design, providing a sensitized plate and treating said plate in cooperation with said image to form said indicia on said plate.

17. A method of producing a cutter die as set forth in claim 16, wherein the steps of preparing said sheet of material include forming said image as an enlargement of said original design, and following the outline of said indicia on a reduced scale to prepare said groove whereby the design in said sheet of material is reduced in size in comparison with the design in said template to minimize lineal irregularities in the groove.

18. A method of producing a cutter die as set forth in claim 17, wherein is included the step of enlarging the image to at least twice the size of said original design, and the reduction thereof is reciprocably related to the enlargement whereby the design formed in said sheet of material is substantially equal in size to said original design.

19. A method of producing a cutter die as set forth in claim 8, wherein the steps of constructing said template include preparing an original design, making a photographic positive of said design, sensitizing one surface of a plate with a radiation sensitive material, superimposing said positive over said one surface, exposing said plate to radiation whereby the portions of said sensitive material beneath the transparent areas of said positive are activated, removing the unactivated sensitive material from said plate, and treating said plate to selectively form said indicia on the exposed portions thereof.

References Cited
UNITED STATES PATENTS

| | | | |
|---|---|---|---|
| 2,349,920 | 5/1944 | Welcome | 76—107 |
| 3,187,606 | 6/1965 | Ohntrup | 76—107 |

GRANVILLE Y. CUSTER, JR., *Primary Examiner.*